(12) United States Patent
Stock

(10) Patent No.: US 10,704,586 B2
(45) Date of Patent: Jul. 7, 2020

(54) MANUALLY OPERABLE LOCKING DEVICE

(71) Applicant: Resbig Technology GmbH, Eppstein (DE)

(72) Inventor: Bernd Stock, Flörsheim (DE)

(73) Assignee: Resbig Technology GmbH, Eppstein (DE)

(*) Notice: Subject to any disclaimer, the term of this patent is extended or adjusted under 35 U.S.C. 154(b) by 431 days.

(21) Appl. No.: 15/834,086

(22) Filed: Dec. 7, 2017

(65) Prior Publication Data
US 2018/0180082 A1 Jun. 28, 2018

(30) Foreign Application Priority Data
Dec. 23, 2016 (DE) .................... 20 2016 107 318 U

(51) Int. Cl.
| | | |
|---|---|---|
| *F16B 21/12* | (2006.01) | |
| *F16B 21/16* | (2006.01) | |
| *B60B 3/16* | (2006.01) | |
| *B60B 11/06* | (2006.01) | |
| *B60B 3/14* | (2006.01) | |

(52) U.S. Cl.
CPC .............. *F16B 21/12* (2013.01); *B60B 3/165* (2013.01); *B60B 11/06* (2013.01); *F16B 21/165* (2013.01); *B60B 3/14* (2013.01); *B60B 2900/3312* (2013.01)

(58) Field of Classification Search
CPC ........ F16B 21/02; F16B 21/165; F16B 21/12; B60B 3/165; B60B 11/06
See application file for complete search history.

(56) References Cited

U.S. PATENT DOCUMENTS

| | | | | |
|---|---|---|---|---|
| 4,198,080 A | * | 4/1980 | Carpenter | .......... A61M 39/1011 24/635 |
| 7,654,027 B1 | * | 2/2010 | Grover | .................. F16B 21/165 24/573.11 |
| 2002/0021005 A1 | * | 2/2002 | Giovanni | .............. B67C 7/0006 285/145.3 |
| 2007/0134061 A1 | * | 6/2007 | Nance | ................. E05B 47/0045 403/362 |
| 2009/0110477 A1 | * | 4/2009 | Seger | .................... F16B 21/165 403/376 |
| 2012/0319399 A1 | * | 12/2012 | Schweizer | ............ B30B 15/026 285/313 |

(Continued)

*Primary Examiner* — Daniel J Wiley
(74) *Attorney, Agent, or Firm* — Michael Soderman

(57) ABSTRACT

A locking device for releasable locking with a counter body, having a base body, which is connected together with an add-on element and a connection element, and actuation means. One or more slides are fastened to the actuation means, which exert a relative movement to the locking device, whereby the slides are able to be brought into contact with the locking means and these can be transferred into a counter geometry of the counter body. Here, the actuation means remain in their respective position due to the return springs of the locking means and of the tension resulting therefrom as well as of a frictional resistance between locking means and slides. An automatic securing device is provided as secondary securing, designed as a spring-loaded securing bolt for securing the position of the actuation means and prevents unintentional opening of the locking device.

9 Claims, 3 Drawing Sheets

(56) References Cited

U.S. PATENT DOCUMENTS

| | | | |
|---|---|---|---|
| 2014/0096467 A1* | 4/2014 | Norton | E04F 13/0833 |
| | | | 52/582.2 |
| 2016/0047408 A1* | 2/2016 | Stock | B60B 3/14 |
| | | | 403/326 |
| 2017/0001705 A1* | 1/2017 | Rufino | B64C 1/1446 |
| 2017/0291266 A1* | 10/2017 | Haruna | B23K 37/053 |
| 2018/0051736 A1* | 2/2018 | Siegmund | F16B 19/109 |
| 2018/0274581 A1* | 9/2018 | Anderes | F16B 35/06 |
| 2019/0257340 A1* | 8/2019 | Stock | B60B 3/14 |
| 2019/0358712 A1* | 11/2019 | Stefan | A61B 90/57 |

* cited by examiner

MANUALLY OPERABLE LOCKING DEVICE

CROSS REFERENCE TO RELATED APPLICATIONS

This application claims the priority of DE 202016107318.9 filed on 2016 Dec. 23; this application is incorporated by reference herein in its entirety.

BACKGROUND

The invention relates to a locking device for releasable locking with a counter body, having a base body, which is connected together with an add-on element and a connection element, preferably by means of screws, and an actuator.

From the prior art, the use of locking devices for connecting at least two components from a number of technical fields is known from the prior art. It is, for example, known that fastening wheel rims and thus a wheel to wheel axles takes place by means of a plurality of screw connections. The screw connections are arranged in a circular manner around the central axis on the wheel axle. In the case of sports cars, it is known that the connection takes place by means of a single central nut or screw. In DE 61 00 25 A and DE 62 53 10 A, alternative connection types are disclosed, in which a connection of the wheel rim to the wheel axle is achieved by clamping a clamping piece.

The above-mentioned locking devices have the disadvantage that the connection between the components is time-consuming if three to five or more screws or nuts can be loosened and correctly refitted. Furthermore, there is a disadvantage that in order to connect the screws or nuts, a tool such as a torque key is required, which is not always available. In addition, a high degree of effort is required in order to fasten the screws or nuts.

Another locking device is, for example, known from DE 19 59 884 A. Here a rapid closure for safety belts in vehicles is disclosed, which has a base body and a locking means for locking the base body to a counter body. The rapid closure consists of a sleeve and a locking pin insertable therein, having members for cooperating with locking balls arranged in the sleeve, which are retained by a spring-loaded sleeve in a non-locking position and are guided into locking engagement with the locking pin in the case of the locking pin being introduced into the sleeve. Furthermore, a safety member is provided, which prevents a displacement of the sleeve by means of a member other than the locking pin.

However, this rapid closure has the disadvantage that in the case of actuating the actuator, said actuator is not automatically transferred into a locking position. In fact, the locking takes place such that in the standby position of the closure, the locking pin is inserted into the sleeve. The head then displaces the sleeve downwards. As soon as the sleeve with its upper edge reaches below the transverse bores, it frees the locking balls so that the latter, if the head of the locking pin has also passed the bores, is compressed into the recess by the spring through cooperation of the ring. The rapid closure is then located in the locking position.

The actuator is also not automatically moved into the locking position by the displacement device after exceeding a centre point.

SUMMARY

The invention relates to a locking device (1) for releasable locking with a counter body (8), having a base body (2), which is connected together with an add-on element (3) and a connection element (4), and actuator (5). One or more slides are fastened to the actuator (6), said one or more slides exerting a relative movement to the locking device (1), whereby the slides (6) are able to be brought into contact with the lock (7) and these can be transferred into a counter geometry of the counter body (8). Here, the actuator (5) remains in its respective position due to the return springs (9) of the lock (7) and of the tension resulting therefrom as well as of a frictional resistance between the lock (7) and slides (6).

An automatic securing device is provided as secondary securing, designed as a spring-loaded securing bolt (10) for securing the position of the actuator (5) and prevents unintentional opening of the locking device (1).

DETAILED DESCRIPTION

The object of the invention is to provide a manually operable locking device which is easy to handle and enables a connection between at least two components to be connected, without the aforementioned disadvantages occurring.

This object is solved by one or more slides being fastened to the actuator, said one or more slides exerting a relative movement to the locking device, wherein the slides are able to be brought into contact with a lock and these can be transferred into a counter geometry of the counter body, wherein the actuator remains in its respective position due to the return spring of the lock and of the tension resulting therefrom as well as of a frictional resistance between the lock and slides, and as secondary securing, an automatic securing device, designed as a spring-loaded securing bolt, prevents unintentional opening of the locking device, wherein the secondary securing takes place by means of a securing ring, bolt or screw.

The actuator is directly connected to the base body and, upon actuation of the actuator, automatically move said actuator into a locking position. In the locking position, the actuator with the connected slides is in contact with the lock and transfer these into a locking position.

Advantageous embodiments of the invention are the subject matter of the dependent claims.

According to them, the actuator has at least one slide, in particular at least one slide connected to them, for transferring the lock into the locking position, wherein the lock is arranged in the base body.

To ensure movement of the lock towards and away from the counter body, the at least one slide has an inclined surface form pointing towards the respective lock. This also applies if more than one slide is provided.

Additionally, the connection element has at least one recess into which the actuator, in particular the slides, penetrate at least partially to transfer the lock into the locking position.

Furthermore, the base body has a blind hole or a through-hole, into which the counter body can at least partially penetrate. The blind hole or the through-hole preferably has a round shape or a polygonal shape and an end section of the counter body can have the suitable round shape or polygonal shape for this purpose.

In addition to this, the counter body has a particularly circumferential groove into which the lock penetrates for locking. Preferably, the contact areas of the blind hole or through-hole of the base body to the circumferential groove of the counter body are designed as slide bearings.

The base body can be connected to a wheel rim or a wheel retainer of a vehicle.

A locking device designed in this manner has the advantage that, in order to achieve the connection between the base body and the counter body, a number of fastening means, such as for example, screws or nuts do not have to be used. The connection can be carried out by actuating a single actuator, whereby the time requirement is reduced. A further advantage of the locking device is that no more tools are required since the actuator can be actuated by the user by hand. The locking device can produce a secure, detachable mechanical connection between two components. In particular, the locking device can be used for connecting rigid as well as rotatable components and can securely transfer large mechanical forces as well as torques.

By providing the displacement device, which automatically moves the actuator into the locking position, great effort is no longer required to connect the base body to the counter body. Furthermore, it is ensured that the base body is always fixed on the counter body with the same force, whereby a connection process with high repetition accuracy is guaranteed. The user thus does not require any knowledge, for example, regarding the tightening torque prescribed by the manufacturer. In addition, the locking device enables a precise, secure and time-limited or permanent connection between the base body and the counter body. In particular, the locking device prevents an undesired release of the connection between the base body and the counter body from taking place during operation, which requires checking the connection, for example after a determined time period.

The locking device can serve for connecting at least two components. The base body can be connected to a first component and the counter body to a second component. The detachable connection can be carried out in both cases by a screw connection.

The locking device can be used in particular in the automotive field. In this case, the base body can be integrally or detachably connected to a wheel rim or a wheel retainer such as, for example, a wheel axle or a wheel hub, as the first component. Accordingly, the counter body can be integrally or detachably connected to the wheel retainer or the wheel hub. Naturally, the use of the locking device is not limited to the automotive field. Alternatively, the locking device can also be used for fitting objects in manufacturing or production processes.

In the context of the invention, the locking position of the lock is understood as the position, in which the lock locks and/or connects the base body and the counter body to each other. Furthermore, in the context of the invention, automatic movement of the actuator is understood as a movement of the actuator, which is effected by the displacement device. The actuator can thus be moved into the locking position after the initialisation, without further influence from the user, solely due to the force exerted by the displacement device. Naturally, the user can support the movement of the actuator by actuating the actuator, in addition to the exertion of force by the displacement device.

Furthermore, the displacement device can counteract or, in particular, prevent a movement of the unactuated actuator from the unlocking position into the locking position or vice versa. It is thereby achieved that the actuator cannot move automatically without an application of force by the user or the displacement device cannot move due to the force of its own weight or centrifugal force or other external mechanical forces. As a result, it is achieved that the actuator remains in the current position.

The connection or locking between the base body and counter body can only be triggered when a triggering force, in particular a force exerted by the user, is greater, according to the principle of the lever, than a force acting in the idle state.

In a particular embodiment, the actuator can have at least one slide for transferring the lock into the locking position. The slide(s) can be designed integrally with the actuator. The slide(s) can be provided in the axial direction of the actuator. In the event that a plurality of slides are provided, the slides can be arranged adjacent to each other in the circumferential direction of the actuator.

The lock can be arranged in the base body, in particular in one or a plurality of hole(s)/recesses of the base body. Furthermore, the base body can have one or a plurality of recess(es), into which the actuator, in particular the slide(s) penetrate(s) at least partially to transfer the lock into the locking position.

In addition, the actuator and/or the slide of the actuator can be configured such that the latter is/are, in particular directly in contact with the lock and the latter transfer, in particular compress into the locking position. The part of the actuator and/or slide pointing to the lock can be configured obliquely. In this way, a simple transfer or compression of the lock into the locking position is achieved.

The respective lock can be a cylindrical or spherical body. Naturally, the lock can also have another form, provided it is ensured that the lock can ensure a locking between the base body and the counter body.

Furthermore, the locking device can have a securing device. The securing device serves for securing the actuator in the locking position. By providing the securing device, the actuator is prevented from moving in an undesired manner from the locking position into the unlocking position and the connection thereby releasing. The securing device can preferably have a securing bolt that automatically bursts out as a result of elastic force. The securing bolt can be actuated by a user.

In one particular embodiment, the base body can have a through-hole, into which the counter body can at least partially penetrate. The counter body penetrates into the through-hole when a locking and thus connection between the base body and the counter body is to be implemented.

The lock can be positioned in the base body such that it engages in the locking position in the hollow space of the base body, in particular in the radial direction. In this regard, the lock can at least partially penetrate or engage through the through-hole into a groove of the counter body arranged on the outer circumference of the counter body. In this regard the groove on the counter body is arranged such that, in the case of the counter body penetrating into the base body or the base body being slid onto the counter body, the groove is located opposite the recess and the lock located therein. The groove can extend fully or partially around the counter body.

The idea underlying this invention will be described in the following description in more detail based on an exemplary embodiment that is shown in the drawings.

BRIEF DESCRIPTION OF THE DRAWINGS

Here are shown.

DETAILED DESCRIPTION OF THE PREFERRED EMBODIMENTS

Figure 1:
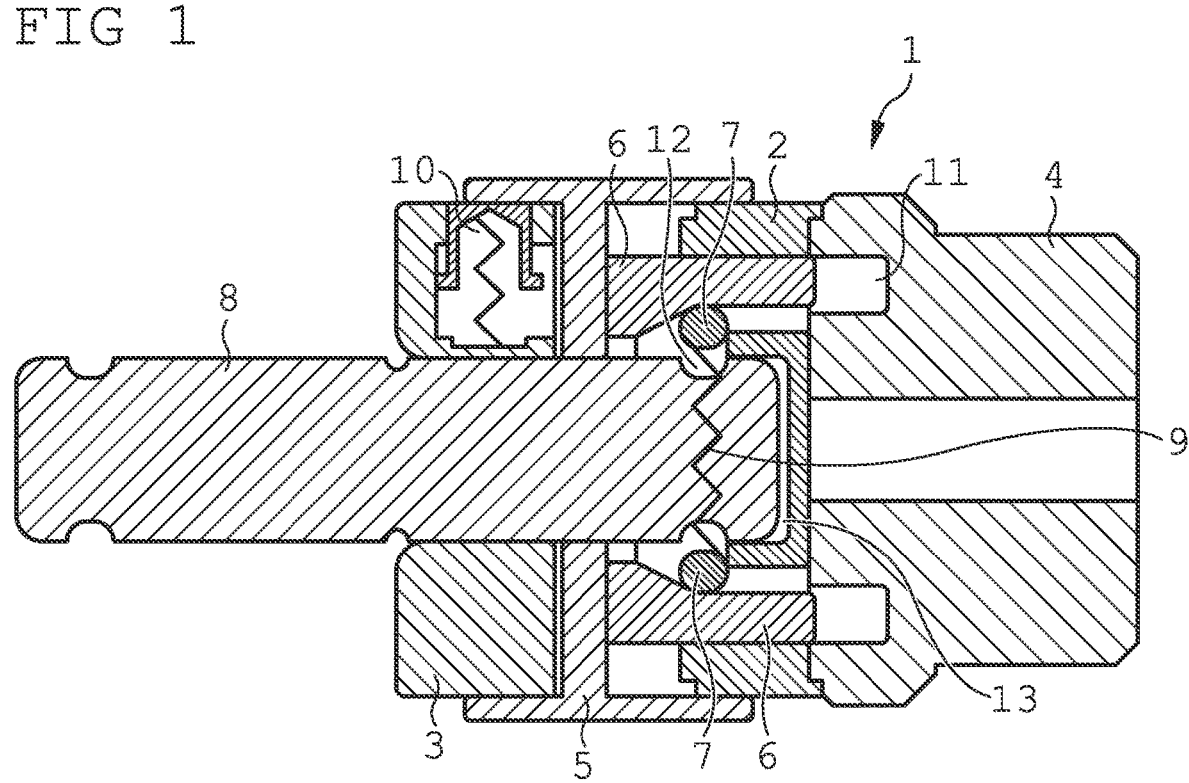
FIG. 1: a longitudinal section of a locking device according to the invention in an opened state with a counter body.
Figure 2:
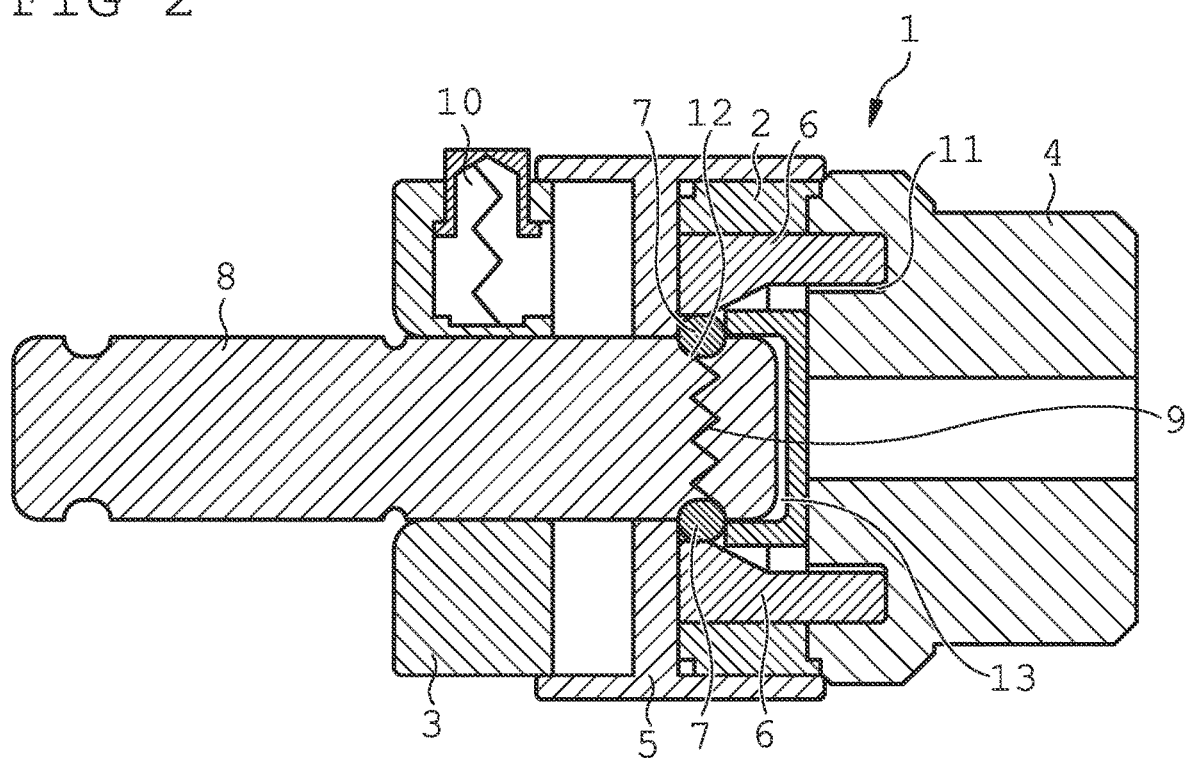
FIG. 2: a longitudinal section of a locking device according to the invention in a closed state with a counter body.

The locking device shown in FIGS. 1 and 2 is used to releasably lock a counter body.

The locking device 1 has a base body 2, which is connected together with an add-on element 3 and a connection element 4, preferably by means of screws. Moreover, the locking device 1 has an actuator 5 that is connected to a securing device that has a spring-loaded securing bolt 10. This is releasable on an external side of an add-on element 3 and arranged in a manually operable manner. The actuator 5 can be moved relative to the base body 2 in the longitudinal direction.

Furthermore, the actuator 5 has protruding slides 6 on the side remote from the securing device 3, thus on the side facing the base body 2, in the axial direction of the actuator 5. These slides 6 are fixedly or movably connected to the actuator 5. Each slide 6 has an inclined surface form pointing towards the respective lock 7. The lock 7 is held in position by associated return springs 9, preferably pressure springs in accordance with FIG. 1.

Figure 3A:
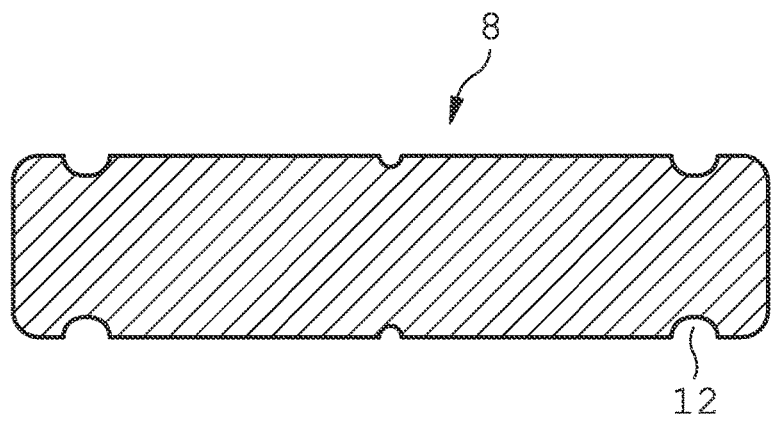
FIG. 3A: a side sectional view of the counter body in FIGS. 1 and 2, FIG. 3B: a head-on view of the counter body in FIG. 3A with section lines.
Figure 3B:
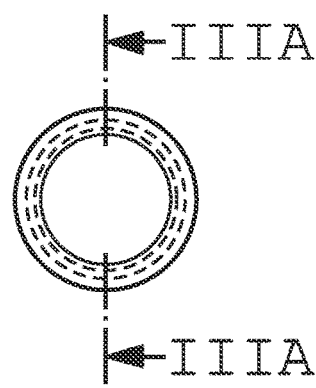
Figure 4:
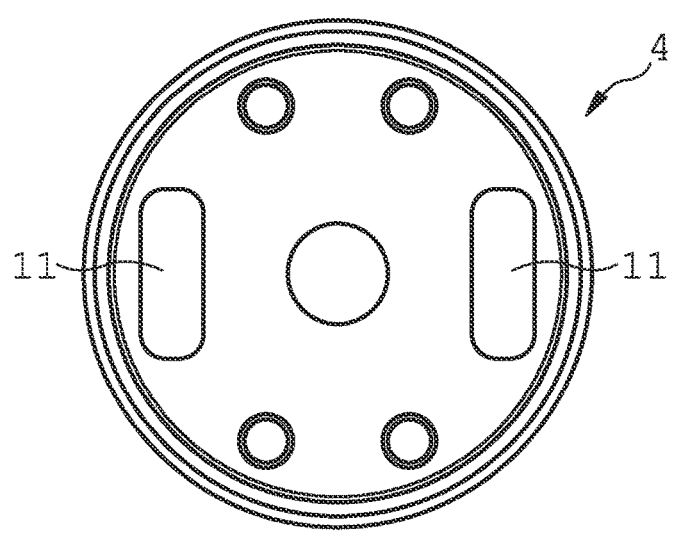
FIG. 4: a top view of the connection element used in the locking device.

The base body 2 can be detachably connected to a counter body 8, shown in FIG. 3. The connection element shown in FIG. 4 has recesses 11, into which the slides 6 can engage in the case of actuating the actuator 10, as is shown in FIG. 2 in the closed state of the locking device 1. Naturally, the slides 6 can again exit the recesses 11 in the case of unlocking, as is shown in FIG. 1. in the opened state of the locking device 1.

In the exemplary depiction in accordance with FIGS. 1 and 2, two slides 6 are available, wherein, however, more than two slides may also be available.

The locking device 1 can also be connected with the counter body 8 shown in FIGS. 2 and 3. The counter body 8 has a circumferential groove 12, into which the locking 7 means penetrate for locking. In addition to this, the base body 2 has a blind hole or a through-hole 13 into which the counter body 8 can at least partially penetrate and thus the lock 7 can be compressed in the radial direction into the groove 12.

The moveable lock 7, for example in the form of a sphere, is provided in the base body 2. The lock 7 is arranged in a hole of the base body 2, wherein the hole is connected to the recess 11. The slide 6 protrudes into this recess 11, said slide being fastened to the actuator 5 in a mechanically fixed or moveable manner, or alternatively being part of the actuator 5.

In FIGS. 1 and 2 the locking device 1 is shown in a position in which it is connected to the counter body 8. The counter body is arranged in the through-hole 13. The actuator 5 is located in a locking position in accordance with FIG. 2, in which the slides 6 of the actuator 5 are in contact with the lock 7. The slides 6 compress the lock 7 into the locking position. In this locking position, the lock 7 engages into the groove 12 of the counter body 8.

Below, the connection process will be explained in detail, wherein it proceeds from the position depicted in FIG. 1, in which the locking device 1 is not connected to the counter body 8.

In the position depicted in FIG. 1, the actuator 5 is located in the unlocking position, in which the actuator or the slides 6 of the actuator 5 are not in contact with the lock 7.

So that a connection or locking between the locking device 1 and the counter body 8 is produced, the user must position the locking device 1 on the counter body 8. The user must subsequently exert a force on the actuator 5, which displaces the actuator in the axial direction 1 relative to the base body 2 and thus into the locking position.

In the locking position, the slides 6 of the actuator 5 are in contact with the respective lock 7. In particular, the slides 6 compress the lock 7 in the radial direction out from the base body 2. Since the counter body 8 is arranged in the through-hole 13, the lock 7 engages at least partially into the groove 12 of the counter body 8.

A connection and locking between the locking device 1 and the counter body 8 can be carried out by the engagement of the lock 7 into the groove 12. Accordingly, a connection and locking between a first component can be carried out, such as for example the wheel rim, which is connected to the locking device 1 and a second component, such as for example a wheel retainer or wheel hub, which is not depicted.

LIST OF REFERENCE NUMERALS

1 Locking device
2 Base body
3 Add-on element
4 Connection element
5 Actuator
6 Slides
7 Lock
8 Counter body
9 Return spring
10 Spring-loaded securing bolt
11 Recess
12 Groove
13 Blind hole; through-hole

The invention claimed is:

1. Locking device (1) for releasable locking with a counter body (8), having a base body (2), which is connected together with an add-on element (3) and a connection element (4) and an actuator (5), characterised in that one or more slides (6) are fastened to the actuator (5), said one or more slides exerting a relative movement to the locking device (1), wherein the one or more slides (6) are able to be brought into contact a lock (7) and said one or more slides can be transferred into a counter geometry of the counter body (8), wherein the actuator (5) remains in its position due to return springs (9) of the lock (7) and of the tension resulting between the actuator and the return springs as well as of a frictional resistance between the lock (7) and the one or more slides (6), and an automatic securing device is provided as secondary securing, said automatic securing device being a spring-loaded securing bolt (10) for securing the position of the actuator (5) and preventing unintentional opening of the locking device (1), wherein the secondary securing takes place via a securing ring, bolt or screw.

2. Locking device (1) according to claim 1, characterised in that the actuator (5) has one or more slides (6) to transfer the lock (7) into a locking position, wherein the lock (7) is arranged in the base body (2).

3. Locking device (1) according to claim 1, characterised in that the one or more slides (6) have an inclined surface form pointing towards the lock (7).

4. Locking device (1) according to claim 1, characterised in that the connection element (4) has at least one recess (11) into which the actuator (5) penetrates at least partially to transfer the lock (7) into a locking position.

5. Locking device (1) according to claim 1, characterised in that the base body (2) has a blind hole or a through-hole (13), into which the counter body (8) can at least partially penetrate.

6. Locking device (1) according to claim 5, characterised in that this blind hole or the through-hole (13) has a round shape or a polygonal shape and an end section of the counter body (8) can have a corresponding suitable round shape or polygonal shape.

7. Locking device according to claim 5, characterised in that contact areas of the blind hole or through-hole (13) of the base body (2) to a circumferential groove (12) of the counter body (8) are slide bearings.

8. Locking device according to claim 1, characterised in that the counter body (4) has a circumferential groove (12) into which the lock (7) penetrates for locking.

9. Locking device (1) according to claim 1, characterised in that the base body (2) is connected to a wheel rim or a wheel retainer.

\* \* \* \* \*